Jan. 21, 1941.  G. R. GODBER  2,229,070
NONFLOODING FILLER CLOSURE FOR STORAGE BATTERIES
Filed July 7, 1939
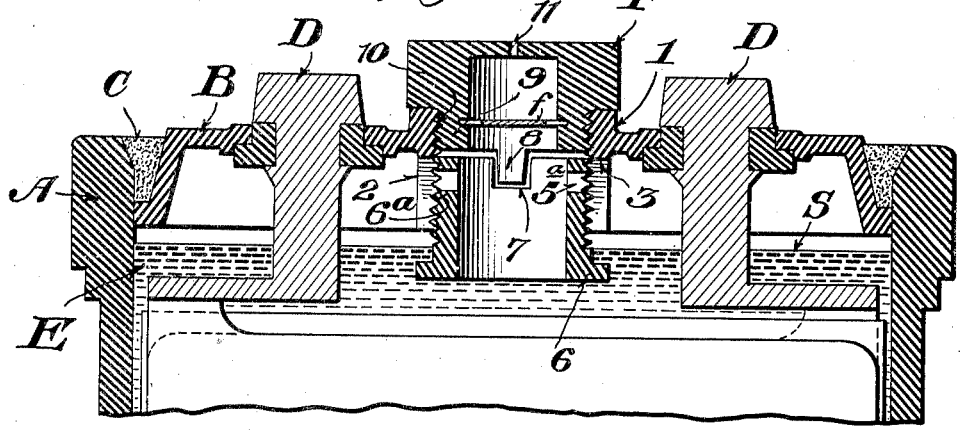
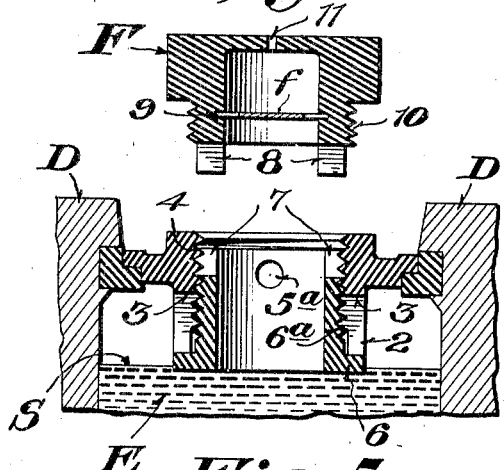
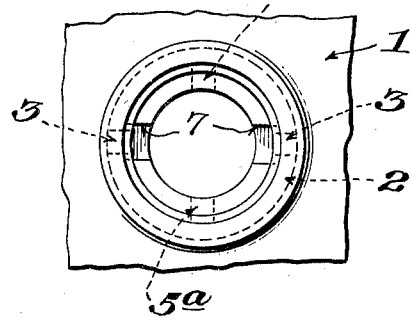
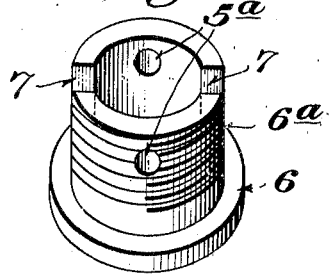
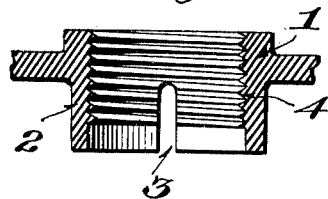
Inventor
George R. Godber
By (signature)
Attorneys Patented Jan. 21, 1941

2,229,070

UNITED STATES PATENT OFFICE 2,229,070

NONFLOODING FILLER CLOSURE FOR STORAGE BATTERIES

George R. Godber, Los Angeles, Calif.

Application July 7, 1939, Serial No. 283,296

2 Claims. (Cl. 136—178)

This invention relates to electric storage batteries of the type using an electrolyte, and has primarily in view a novel nonflooding filler closure construction to aid in readily determining and maintaining the correct electrolyte level in the battery cells.

The installation of storage batteries under the hoods of automobiles in recent years, together with higher charging rates and increasing demands on batteries, have resulted in operating difficulties which it is the object of the present invention to overcome. Whenever the electrolyte level in the cells of a storage battery becomes too high, there is a strong tendency for the surplus electrolyte to escape through the cell vent due to the accumulation of gas in the cell while it is being charged by the generator, or, on the other hand, due to splashing when the car is in motion, or even by capillary action. Whether the electrolyte is lost by actually splashing out, or in the form of a vapor, it causes undesirable results on all parts of the automobile with which it comes in contact. In other words, the electrolyte either eats away, or causes corrosion of the parts installed under the hood, for example, ignition wiring, coils, etc., and frequently these accessories are often damaged to the point where the motor will not operate, and the finish of the motor as well as the outside finish of the automobile becomes ruined.

Accordingly, a primary object of the invention is to provide a filler construction which provides means that will prevent the cells of a storage battery from being overfilled, and which in use will give greater protection to the parts of the car under the hood than is the case with storage batteries, having the usual filler cap having no special means for preventing the escape of electrolyte. In that connection, the invention contemplates a construction which not only determines the proper electrolyte level in the cell, but also traps a certain amount of air over the surface of the electrolyte in the cell to insure maintaining the proper level of electrolyte, while, at the same time, when the construction is in use, the air space at the top of the electrolyte within the cell will be placed in communication with the vented cap to permit the escape of the normal amount of gas generated in the cell, without however, in any way damaging the parts of the automobile due to the fact, that, the vent in the cap is so small that any gases escaping will be sufficiently diluted with air to prevent any damage.

A special object of the invention is to provide a filler cap of more or less standard design, so modified however, as to control a novel valve which cooperates with a ported sleeve on the inside of the cell cover.

With the above, and other objects in view which will more readily appear as the nature of the invention is better understood, the same consists in the novel construction, combination and arrangement of parts hereinafter more fully described, illustrated and claimed.

A preferred and practical embodiment of the invention is shown in the accompanying drawing, in which·

Figure 1 is a vertical sectional view taken through the cell cover of a storage battery showing the present improvements in normal condition.

Figure 2 is a detail vertical sectional view showing the filler cap removed to enable the cell to be filled.

Figure 3 is a detail top plan view of the valve in the sleeve.

Figure 4 is a detail vertical sectional view of the sleeve carried by the under side of the cell cover, said section being taken at right angles to Figures 1 and 2.

Figure 5 is a perspective view of the valve disassociated from the sleeve.

Similar reference characters designate corresponding parts throughout the several figures of the drawing.

According to the embodiment shown in the drawing, a storage battery of any well known construction is designated generally as A. Each cell of the battery is provided with a cover B which is sealed to the walls of the cell by the usual sealing compound C. It will, of course, be understood that the battery includes the usual terminals D carried by the cover and connected with the plates in the cell which plates are covered by the electrolyte E.

According to the present invention the cover B is provided at the location of the filling opening 1 with an integral depending annular sleeve portion 2 carried by the under side of the cover. This sleeve is provided with ports, or slots which serve as ports, designated generally as 3. The sleeve 2 is internally threaded as indicated at 4 and the threads extend upwardly through the filling opening 1 to permit of receiving the threaded plug of the closure cap F as will presently appear.

Within the sleeve 2 there is provided a ring-like valve member 5. Said member is externally threaded as indicated at 6, to engage with the threads 4 of the sleeve. The lower end of the valve 5 is formed with an annular flange or shoulder 6 adapted to abut against the lower edge of the sleeve when the cap F is removed as shown in Figure 2. The body of the valve 5 is provided with one or more radial ports 5ª adapted to register with the ports 2 when the cap F is tightly screwed down on to the cover.

The upper edge of the valve 5 is formed with one or more notches or recesses 7, adapted to receive the complemental lugs or projections 8 carried by the under side of the plug portion 9 of the cap F. The said plug portion 9 is externally threaded as at 10 to also engage with the threads 4 in the sleeve 2. In addition, it may be pointed out that the cap F is hollow and has a vent hole 11.

The cap F may be of any conventional construction used in the trade, including the vented baffle f, with the exception of the downwardly extending lugs 8 previously described and which are preferably located 180 degrees apart to correspond with the location of the recesses or notches 7 in the upper edge of the sleeve.

It may be also pointed out that the opening or openings 3 in the sleeve are so indexed relative to the openings 5a in the valve that when the valve is in its lowermost position as shown in Figure 1, and the filler cap F is tightly seated, the said ports 3 and 5a are in registry. On the other hand, when the valve 5 is in its upward position in the sleeve 2 as shown in Figure 2, the ports 3 and 5a are 90 degrees apart so that there is no vent between the inside and outside of the sleeve 2. Also it may be pointed out that the threads on the plug of the cap F are indexed with regard to the lugs 8 and are of the correct length so that when cap F is screwed completely down on to the cover and the valve 5 is moved to its lowermost position, the ports 3 and 5a are in registry.

A battery built with the foregoing construction has the valve 5 assembled in the sleeve 2 before the cover B is sealed in place on the battery cell. The flange 6 on the valve 5 limits the upward travel of the valve into the sleeve 2. With the valve 5 at its uppermost position in the sleeve 2, ports 3 and 5a are out of line and sleeve 2 provides a closed ring without any vent except through the bottom. Electrolyte may be introduced into the cell through the filler opening 1. When the electrolyte E has risen to the point S at the bottom edge of the flange 6 on the sliding valve 5, all venting of the cell is cut off and air pocketed under the cover B forces any further electrolyte which may be added, up into the sleeve 2. This indicates to the operator that sufficient liquid has been added to the cell. The length of the sleeve 2 and the valve 5 are so determined that when the valve 5 is in its uppermost position, its bottom edge is located at the correct point, namely, point S for determining the level of the electrolyte.

When filling or testing is complete, the cap F is put in place with the lugs 8 mating with recesses 7 of the valve 5. As the plug portion of the cap is screwed down in the sleeve 2, the sliding valve 5 is also screwed down due to the interlock between the two parts. When the shoulder at the under side of the cap F reaches the boss on the upper side of the cover surrounding the opening 1, all movement of the parts stops and the ports 3 and 5a are in registry, so that the battery cell is vented above the electrolyte level.

On removal of the cap F, the reverse of the action above described takes place. In other words, due to the interlock between the valve 5 and the cap F, said valve is screwed upwardly until the flange 6 engages the bottom of the sleeve 2. At the same time, the threads on the plug 9 of the cap F are disengaged from the threads 4 on the sleeve 2, whereupon the cap F may be lifted off, and the battery cell may be filled or tested.

From the foregoing, it will be apparent that the present construction provides a simple, foolproof and positive means for controlling the electrolyte level in storage battery cells. Moreover, the construction described lends itself to practical and inexpensive manufacturing and assembling procedures which provide a competitive product.

I claim:

1. In an electric storage battery box, a cover overlying the electrolyte in the box and having a filling opening, and means on the underside of the cover at the location of the filling opening providing a trapped air space in the top of the box to determine the electrolyte level in the box, said means including a sleeve of the same internal diameter as the filling opening and internally threaded throughout, said sleeve having a radial port adapted to communication with said air space, and a tubular valve externally threaded and rotatable to be axially slidable in the sleeve, said valve also having a radial port, and a cap for said filling opening including a threaded plug adapted to engage the internal threads of the sleeve, said cap having a vent for establishing communication from the air space through the sleeve and valve to the atmosphere, a cooperating key means on the cap and valve for releasably coupling the same together, and whereby, when they are coupled and the cap rotated, the valve will be actuated so that when the cap is moved to covering position, the ports in the sleeve and the valve are in registry to establish communication between the air space and the vent through the valve and sleeve, and when the cap is rotated to be removed from the filling opening, the valve is axially shifted to close the ports and its lower end determines the electrolyte level in the box.

2. In an electric storage battery box, a cover overlying the electrolyte in the box and having a filling opening, and means on the underside of the cover at the location of the filling opening providing a trapped air space in the top of the box to determine the electrolyte level in the box, said means including a sleeve of the same internal diameter as the filling opening and internally threaded, said sleeve having a radial port adapted for communication with said air space, and a tubular valve externally threaded to engage the threads of the sleeve and provided at its lower end with a shoulder adapted for abutment with the sleeve while its upper edge is provided with recesses, said valve also having a radial port, and a vented cap for said filling opening having an externally threaded plug for engaging with the internally threaded sleeve and having lugs for engaging said recesses to releasably couple the cap and valve, and whereby, when they are coupled and the cap rotated to close the filling opening, the valve will be lowered so that the ports in the sleeve and the valve are in registry to establish communication between the air space and the vent in the cap through the valve and sleeve, and when the cap is rotated to be removed from the filling opening, the valve is lifted to close the ports and its lower end determines the electrolyte level in the box.

GEO. R. GODBER.